(12) United States Patent
Pan

(10) Patent No.: US 8,150,804 B2
(45) Date of Patent: Apr. 3, 2012

(54) HIERARCHICAL CATEGORIZATION OF MEDIA ASSETS AND USER INTERFACE FOR MEDIA PLAYER

(76) Inventor: Yang Pan, Shanghai (CN)

( * ) Notice: Subject to any disclaimer, the term of this patent is extended or adjusted under 35 U.S.C. 154(b) by 293 days.

(21) Appl. No.: 12/175,455

(22) Filed: Jul. 18, 2008

(65) Prior Publication Data

US 2010/0017361 A1    Jan. 21, 2010

(51) Int. Cl.
*G06F 7/00* (2006.01)
(52) U.S. Cl. ....................................................... 707/621
(58) Field of Classification Search .................. 707/621, 707/640, 723
See application file for complete search history.

(56) References Cited

U.S. PATENT DOCUMENTS

| | | | |
|---|---|---|---|
| 6,928,433 | B2 | 8/2005 | Goodman et al. |
| 7,096,234 | B2 | 8/2006 | Plastina et al. |
| 7,124,304 | B2 | 10/2006 | Bel et al. |
| 7,136,934 | B2 | 11/2006 | Carter et al. |
| 2002/0147728 | A1* | 10/2002 | Goodman et al. ......... 707/104.1 |
| 2003/0095096 | A1 | 5/2003 | Robbin et al. |
| 2006/0156239 | A1* | 7/2006 | Jobs et al. ..................... 715/727 |
| 2006/0163358 | A1* | 7/2006 | Biderman ................ 235/472.01 |
| 2006/0206380 | A1* | 9/2006 | Joo ................................... 705/14 |
| 2007/0084333 | A1* | 4/2007 | Robbin et al. .................. 84/600 |
| 2007/0136608 | A1 | 6/2007 | Kirovski et al. |
| 2007/0169115 | A1 | 7/2007 | Ko et al. |
| 2007/0220552 | A1 | 9/2007 | Juster et al. |
| 2008/0013274 | A1 | 1/2008 | Jobs et al. |
| 2008/0244659 | A1* | 10/2008 | Stallings et al. ................ 725/52 |
| 2009/0171812 | A1 | 7/2009 | Fadell |

* cited by examiner

*Primary Examiner* — Truong Vo

(57) ABSTRACT

An improved hierarchical user interface for a handheld media player is disclosed, which classifies media assets that an on-line merchandiser intends to sell to the user as hidden files. The files are invisible to a user without a user's intended and persistent interaction with a user input device of the player. The media assets that an on-line merchandiser intends to sell to the user are stored in the unused storage capacity of the player and are organized in a single structure as those media assets owned by the user. A method includes a means that a user actuates a user input device until the hidden files are displayed. Furthermore, a method is disclosed to utilize a file storage system of a portable media player more effectively and efficiently. The unused storage capacity is then used by the on-line merchandiser to store media assets, which have not been purchased by the user at the moment when they are received by the media player. The capacity occupied by the media assets from the merchandiser is adjusted dynamically based upon the required capacity by the user at a specific time. The media assets stored are managed based on their assigned priorities.

8 Claims, 8 Drawing Sheets

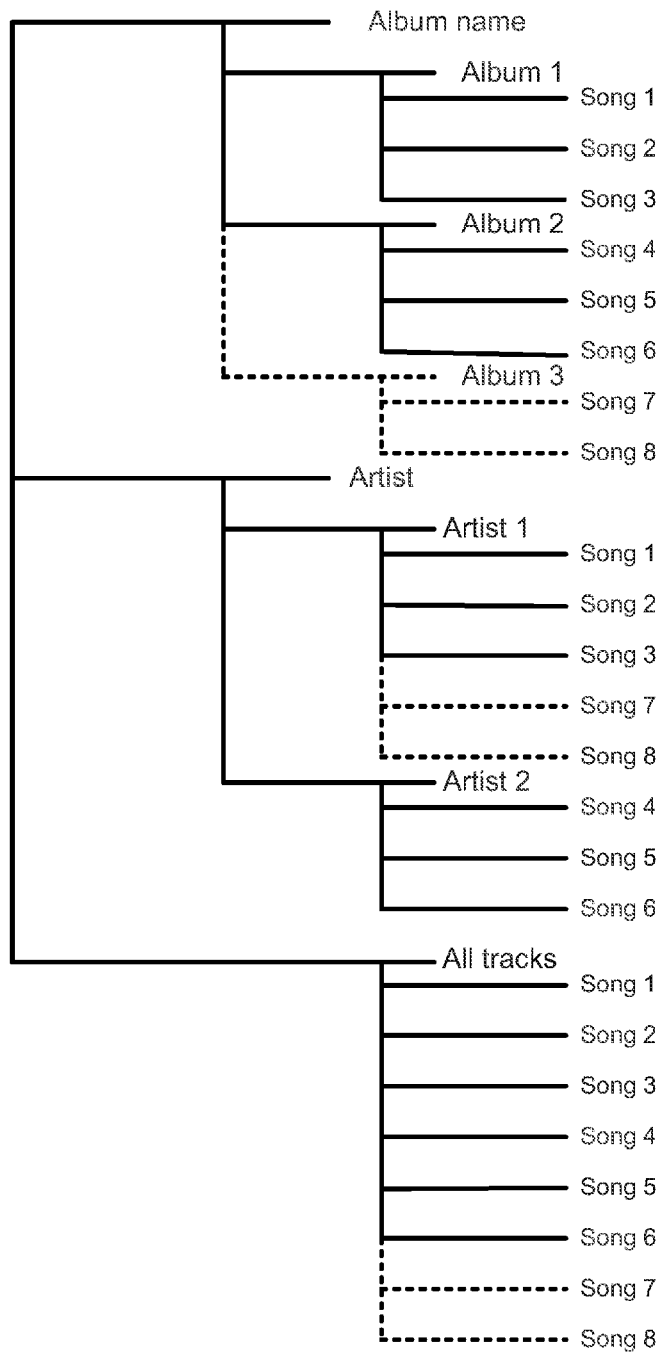

HIERARCHICAL CATEGORIZATION OF MEDIA ASSETS AND USER INTERFACE FOR MEDIA PLAYER

CROSS-REFERENCE TO RELATED APPLICATIONS

Not applicable.

BACKGROUND

1. Field of Invention

This invention relates generally to multimedia devices. More specifically, the invention describes an improved hierarchical categorization of media assets and user interface for use in a portable media player.

2. Description of Prior Art

A portable media player stores media assets such as songs and video clips, which can be played on the device. Examples of media players are the iPod from Apple Inc. of Cupertino, Calif., the Zen from Creative Technology Ltd, Singapore and the Zune from Microsoft Inc of Redmond, Wash. The portable media players have gained popularity because of its capability to store large number of media assets in a device, which can be put into a user's pocket when one travels.

In order to achieve portability, many portable media players use minimalist displays that allow the user access to the media assets via simple graphical user interfaces. The large number of media assets are organized in a way of automatic hierarchical categorization by metadata as disclosed in a U.S. Pat. No. 6,928,433 to Goodman and Egan (2005). Robbin et al further disclosed a hierarchically ordered graphical user interface in US patent application 2004/0055446. A user, guided progressively by a user interface from the higher order to the lower order, can select a desired media asset.

A media player acquires typically its media assets from a computer with media management applications, such as the iTunes software, which is a product from Apple. In prior art, the portable media players are stored with the media assets transferred from a computer. The management of media database, including selection and purchasing of media assets from an on-line merchandiser, is performed with the use of the computer connected to the internet. The on-line merchandisers have developed methods, such as iTunes from Apple, to display, on a computer display screen, recommended media assets to a user while the user is performing a task related to a specific media item. The recommended media assets are related closely to the item. For example, they may be other albums from the same artist.

A user typically spends more time with portable media players than with computers for multimedia entertainment experiences. It is desirable that the recommended media assets from an on-line merchandiser are stored in the portable media players rather than in much less portable computers. There are two key issues associated with the actions for pushing recommended media assets to a user's portable device. First, a user may not like the practice that an on-line merchandiser to use one's storage capacity in a portable device to help the merchandiser to sell a commercial media product. Second, a user may not prefer to be disturbed by such advertisement type of messages in an already small display for a pocket sized device.

Accordingly, it is a purpose of the present invention to provide an improved hierarchical user interface in a handheld media player, which classifies media assets that an on-line merchandiser intends to sell to the user as hidden files. The files are invisible to the user without the user's intended and persistent interaction with the player.

It is a further purpose of the present invention to provide an improved hierarchical user interface in a handheld media player, wherein the media assets that an on-line merchandiser intends to sell are organized in a single hierarchical structure as those media assets owned by the user.

It is still a further purpose of the present invention to provide a method to manage effectively a file storage system of a handheld media device. The storage capacity used by storing hidden media files is changed in accordance with the variation of the required capacity by the user.

SUMMARY OF THE INVENTION

The invention described herein pertains to a user interface that provides for a user friendly and efficient retrieval of media assets including assets that belong to an on-line merchandiser. The assets are pushed to a user's handheld media player for a potential revenue generating objective for the merchandiser.

In one embodiment, each media asset is associated with a metadata of the asset. The metadata is descriptive for the file and includes a format with multiple fields for holding data indicating the name of the album the track is from, the name of the asset, the genre of the asset and the type of track. There are two added fields in the present invention in comparison to conventional ones. One of them indicates the type of asset that can be taken as "normal" or "hidden" asset. Another indicates the priority of the asset with regards to the use of the storage capacity.

For media assets that a user owns, they may be presented to a user in a conventional way as implemented in an iPod from Apple. For media assets pushed by an on-line merchandiser to the user's media player, they can be organized similarly as those assets owned by the user. However, the playlists of the hidden assets are invisible to a user without an intended and persistent user interaction with the user input device. When a user is scrolling through a list of albums of an artist, those albums related to the same artist will not be displayed on the screen when their filed indicators indicating that they are hidden ones. If the user continues to actuate the user input device as if there were more albums in the list while the last album has been displayed on the screen, a message is then displayed on the screen to alert the user that he or she is entering into a hidden category of the media assets. The hidden assets are the ones that have not been purchased by the user. If the user continues to actuate the input device after viewing the message, the hidden albums will be displayed. The user may then select a media asset from the album in a conventional way and decide to purchase the asset from the merchandiser. The user may go back to the original playlist by actuating continuously the input device in a reverse manner The operation of actuation includes a means that user interacting with a rotational input device by a finger along a predetermined direction. The operation of actuation in a reverse manner includes another means that the user interacting with the rotational input device by a finger along the opposite direction of the predetermined one. Similar operations can be applied to view a hidden playlist associated with artist or genre or any other valid fields.

To effectively utilize the storage system of a handheld media player, the storage system can be divided into three zones. Zone-user is used to store media assets or any other data files owned by the user. Zone-buffer is a buffered storage capacity and Zone-hidden is used to store hidden media assets from an on-line merchandiser. Zone-user has the higher priority than zone-hidden whenever there is a competing requirement on the storage capacity. The size of zone-user is decided by media assets stored. The size of zone-buffer is decided by a system designer to provide a buffered storage capacity between zone-user and zone-hidden. As long as the storage size of zone-user and zone-buffer are known, the remaining part of the storage capacity can be identified and be used to store the hidden media assets. The storage capacity of zone-hidden changes as the media assets stored in zone-user varies. All media assets have a field indicator indicating their priorities. When it is necessary that the zone-hidden capacity is reduced to give a room to the zone-user, the hidden assets stored are removed sequentially according to their priorities. The lower priority files are removed first. The processor in the media player has a software module to manage different zones of the storage system. The use of zone-hidden becomes invisible to the user because the storage capacity in the player is always available to the user whenever it is required.

In one embodiment, the hidden media assets are transferred to the media player when the player is hooked up to a media server that is connected to an on-line merchandiser. The available capacity of the storage space for hidden assets is determined based upon the required capacity from the user and the buffered capacity required by the system. The media assets that fit a user's personal interests are selected by the on-line merchandiser based upon the media asset database of the user. According to one aspect the present invention, the hidden media assets can be selected based upon the user's list of the most played artists. The other albums from the same group of the artists are selected and pushed to zone-hidden of the media player. The priority of each asset can be decided by the ranking of the most played artists from the recorded media interaction history by the user, which is stored in the handheld media player. The storage capacity taken by the selected hidden media assets must be equal or less than the capacity in the zone-hidden of the storage system.

A user as a customer of an on-line merchandiser may have a credit limit associated with media asset purchasing. When a hidden asset is selected by a user, one can pay the merchandiser by deducting from the user's existing credits, which are assigned by the merchandiser. The user can pay the on-line merchandiser next time when the media player is hooked up with a server connected to the internet. One will get the credit replenished after the on-line payment for the previously selected media assets. In an alternative way, a user can pay the on-line merchandiser directly if the media player is connected to the internet wirelessly.

BRIEF DESCRIPTION OF THE DRAWINGS

For a more complete understanding of the present invention and its various embodiments, and the advantages thereof, reference is now made to the following description taken in conjunction with the accompanying drawings, in which:

FIG. 1 is a diagram of a file format for storing filed data and file attributes with added fields for visibility and priority to identify a hidden file and its priority.

FIG. 2 is a user's view of hierarchy with hidden files represented by dashed lines.

DETAILED DESCRIPTION

Figure 3A:
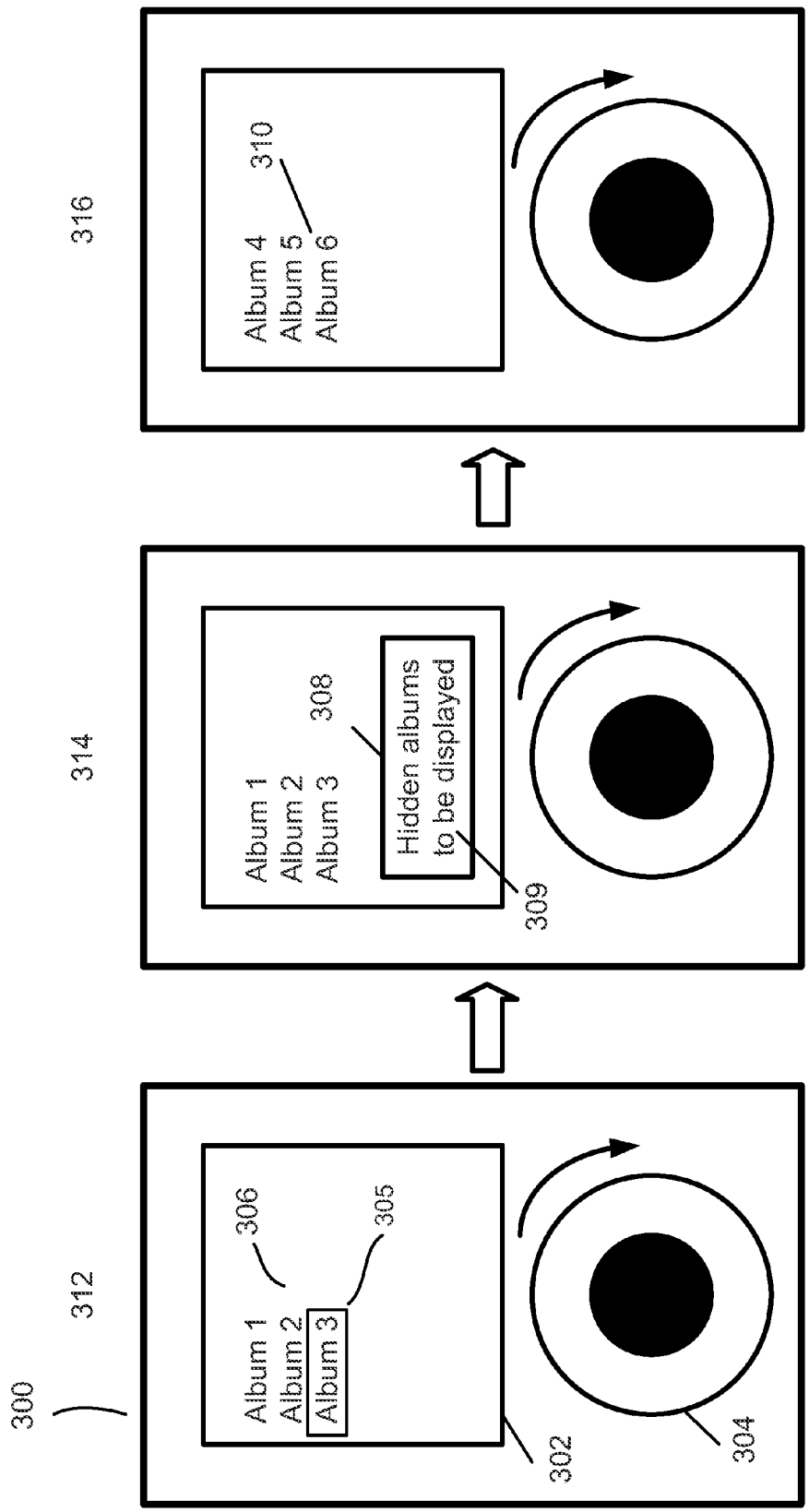
FIG. 3A illustrates an exemplary user interface for viewing hidden media files under a user's interaction.

References will now be made in detail to a few embodiments of the invention, examples of which are illustrated in the accompanying drawings. While the invention will be described in conjunction with the particular embodiments, it will be understood that it is not intended to limit the invention to the described embodiments. To the contrary, it is intended to cover alternatives, modifications, and equivalents as may be included within the spirit and scope of invention as defined by the appended claims.

The term "media player" used in this disclosure generally refers to computing devices that are dedicated to processing media such as audio, video or other images. In one implementation, the media player is a portable computing device. Examples of media players include music players, game players, video players, video recorders, cameras, and the like. These computing devices are generally portable so as to allow a user to listen to music, play games or video, record video or take pictures wherever the user travels. The media player is a handheld device that is sized for placement into a pocket of the user. By being pocket sized, the user does not have to directly carry the device and therefore the device can be taken almost anywhere the user travels.

The media player typically has connection capabilities that allow a user to upload and download data to and from a host device such as a general purpose computer. With regard to music player, songs and playlists stored on the general purpose computer may be downloaded into the music player. In our description of the invention, a music player is taken as an exemplary case for the purpose of the illustration but not limit the scope of the invention.

The basic operation of a media player (music player) is described as follows. A portable media player comprises a processor and a file storage system that is typically a flash memory or a plurality of flash memories. It further comprises user interface unit such as a Liquid Crystal Display (LCD) screen and a user input device such as a rotational user input device used in an iPod from Apple. The file system stores media assets. A user selects a media asset from the user interface. The processor receives the selection and controls the operation of sending the selected media asset to coder/decoder (CODEC) for the signal processing to generate analog signal for further delivering to speakers for an audio experience in case of a music player. The media player has a data link for connecting to a computer. A battery, more particularly, a rechargeable battery is used to provide power for the player.

The media player includes a user input device that allows a user to interact with the device. For example, the user input device can take a variety of forms, such as a button, keypad, dial, etc. A rotational user interface as implemented by Apple in iPod has gained significant popularity. The rotational input device can be continuously actuated by a circular motion of the finger. The finger may rotate relative to an imaginary axis. In particularly, the finger can be rotated through 360 degree of rotation without stopping. This form of motion may produce continuous or incremental scrolling through the list of songs being displayed on the display screen.

Since the display screen associated with a handheld media player is typically small, an efficient user interface is required to allow a user intuitively navigate among, and select, songs to be played. The operation typically includes an overlapping hierarchy of categories. Categories include items that can also be included in other categories so that the categories overlap with each other. Thus, a song title can be accessed in multiple different ways by starting with different categories. For example, the top-level categories "Album", "Artists", "Genres" and "Playlists" are presented to a user first. Within the Albums category are names of different albums of songs stored in the device. Within each album are album tracks, or songs, associated with that album. Similarly, the Artists category includes names of artists which are, in turn, associated with their albums and songs. The Genre category includes types of categories of music such as "Rock", "Classical", "Pop", etc. Within these sub-categories are found associated songs. Finally, the "Playlists" category includes collections of albums and/or songs which are typically defined by the user.

FIG. 1 is a schematic diagram of the media file format including file data in the form of MP3 track, a metadata fields for holding data indicating the name of the album the track is from, the name of the song, the genre of the song and the type of the track. The data format further includes two additional fields. One is used to indicate a file status of 'visible' or 'hidden'. The media files owned by the user have a status indicator of 'visible' that is visible to the user operating the media player in the sense of the conventional user interface. The media assets pushed by an on-line merchandiser to the media player have a status indicator "hidden", which are invisible to the user without additional intended interactions. Another added field is to indicate the priority of the stored media files. For the files with a status of 'visible', they have a default priority "1" without difference. For hidden media files, they are assigned a priority starting from "2" to whatever number it takes to rank all hidden files sequentially FIG. 2 shows what a user's view of this hierarchy might be if he or she were shown a fully expanded view of the 8-song tree including two songs that are pushed by the on-line merchandiser to the media player and are stored as hidden files as indicated by dashed lines in the figure. The hidden files are organized similar as other files owned by the user from the point of view of the data structure.

FIG. 3A illustrates an exemplary user interface for viewing hidden media files under a user's interaction. A media player 300 includes a display screen 302, a rotational user input device 304 and a list of albums 306. When a finger of a user (not shown in the figure) rotates the input device as indicated in 312, a list of albums is presented to the user. A moveable mark 305 changes its position in a linear manner as the user rotates the input device. If the user actuates the rotational interface persistently as indicated in 314, a message window 308 is presented to the user with a message 309 indicating that hidden albums are to be displayed and the user needs to purchase for the consumption of the copyrighted songs. The response can take multiple forms. In addition to the text message displayed, it can take a form of predetermined visual symbols. Further, it can take a form as a multimedia message accompanying by an audio message.

After viewing the text message, the user may make a decision to move forward to view the hidden albums or to return to the original interface by reversely rotating the input device by the finger. If the user indeed decides to view the hidden albums, one can further actuate the rotational user input device in the same predetermined direction as indicated in 316 and the list of hidden albums 310 are then displayed on the screen. A user can scroll further through the list and move into the next level of the hierarchical interface and make a selection of songs to listen to. A user can move back to the original interface anytime he decides by rotating the input devices reversely. It should be noted that additional hidden albums might not always be included in the media player associated with a specific artist. In such a circumstance, a message window will be displayed showing a message such as "no more albums to be viewed". A user's action of actuating further the user input device in the predetermined direction will not yield any more result in such as case. Similar methods for viewing hidden media files can be applied to other sub-categories as "Artists", "Genre" and "Playlists" etc. For example, when a user navigates into a list of songs by a specific artist, the persistently rotating of the input device will lead the user to view all hidden songs by the artist.

Figure 3B:
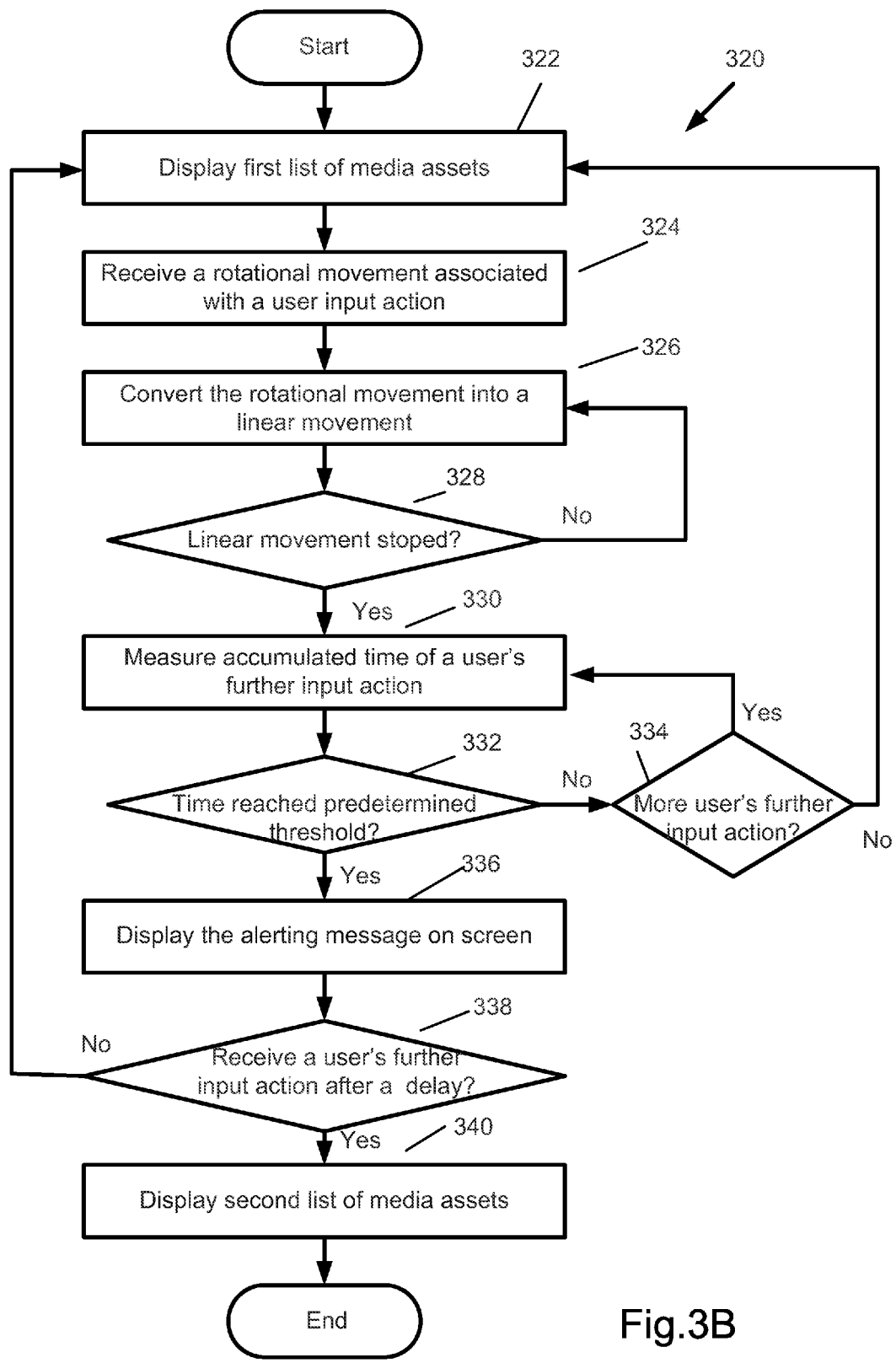
FIG. 3B shows a flow diagram of a user interface for viewing hidden media assets.

FIG. 3B shows a flow diagram of a user interface for viewing hidden media assets. The process 320 starts with a step 322 displaying first list of media assets by a user interacting with a rotational user input device. The media assets are the ones that the user owns right to play with. The media player, more specifically a processor in the player receives the inputs from the user input device as indicated in a step 324 and converts the user interaction into a linear movement of a cursor on the screen in a following step 326. In a conventional art, the user either makes a selection from the list of displayed media assets to move into the next hierarchical level or to scroll through the screen and go back to the higher hierarchical level to make another selection. The present invention describes a step 328, wherein the processor detects an event if the linear movement of a cursor on the screen can not be carried out further. The processor controls an operation to record the time when it happens. If the user's input action is persistent, for example, the user continues to actuate the rotational input device even if the cursor movement has been suspended, the accumulated time for the user's further action is measured in a step 330. The measurement of the accumulated time is carried out by a processor of the media player. A preset value of a threshold time may be stored in the media player. The preset value is typically in between 1 to 10 seconds. Followed by steps 332 and 334, if the recorded time accumulated does not exceed a predetermined value while the user's action is persistent, the time counting operation controlled by the processor continues. On the other hand, if the processor fails detecting the user's further action along the same predetermined direction through the input device during the operation of the time counting, the media player directs the user go back to the displayed first list of the media assets.

If the measured accumulated time exceeds the predetermined value, an alerting message is displayed on the screen and indicates that the user is entering into a hidden category in a step 336. The message may further indicate that a user needs to pay for the selection of media assets from the list of media assets to be displayed. The message will be displayed for a defined short period of time, for example, a period of time sufficient for an average user to read through the message. Afterwards, in a step 338, if the processor detects further user input actions along the same predetermined direction, the second list of media assets (hidden one) is then displayed on the screen and the user may make a selection of one preferred media item after reviewing the list in a step 340. Otherwise, the processor sends a control signal and the display screen goes back to the first list of media assets if the further user actions on the input device are not detected.

Figure 4:
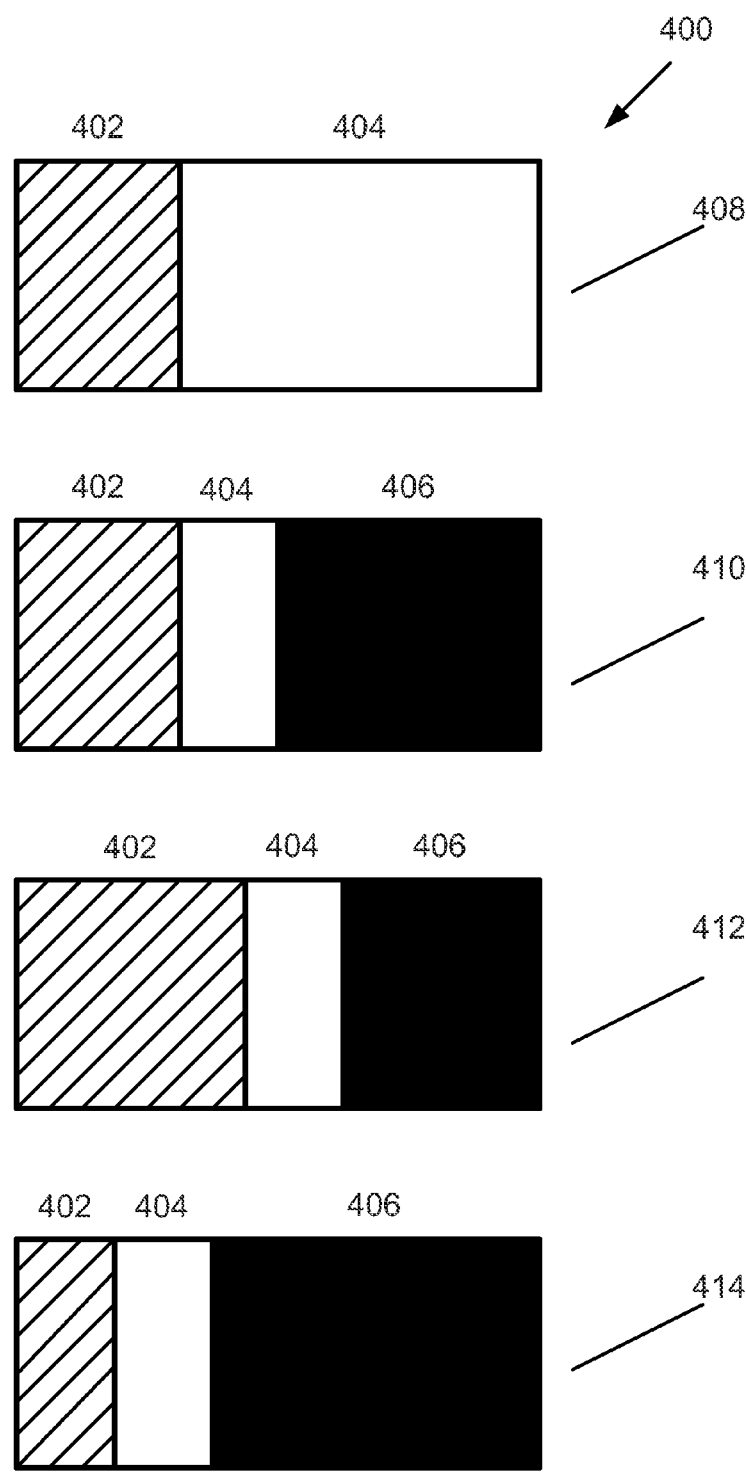
FIG. 4 is a diagram of a storage space for a media player divided into three zones for different applications.

FIG. 4 is a diagram of a storage space for a media player divided into three zones for different applications. A storage system 400 includes a required storage space 402 and an unused storage space 404 as shown in 408. The required space 402 is used to store all media assets and other data owned by a user. The fact that a storage capacity is typically not fully utilized is known for most media players in the market. With increasing in flash memory density and reduction in price, more and more memory "bits" are to be placed into a media player. It is common that significant portion of storage capacity associated with media players is not used. The present invention is intended to use these wasted storage capacity more effectively. The most part of unused storage space 404 can be used to store media files pushed from an on-line merchandiser in a form of hidden assets as indicated in the figure as the zone-hidden 406. A storage system of a media player thus can be divided into three zones as shown in 410. The zone-user 402 is used to store all media assets and other data owned by the user. The zone-buffer 404 is an unused buffer space between the zone-user 402 the zone-hidden 406 that is used to store all media assets from the merchandiser as hidden assets. The data files stored in zone-user 402 have higher priority than the files stored in zone-hidden 406. As we described before that each file has a field indicating its visibility. If a user requires more storage space for media assets or other data files, the zone-user capacity expands automatically while the capacity for zone-hidden is reduced accordingly as shown in 412. Another field indicating the priority for each asset can be used to remove lower priority files sequentially to give space to the zone-user. The operation is controlled by the processor in the media player. On the other hand, as shown in 414 an opportunity can be taken for the on-line merchandiser to add more assets to the zone-hidden if the user required storage space is reduced.

Figure 5:
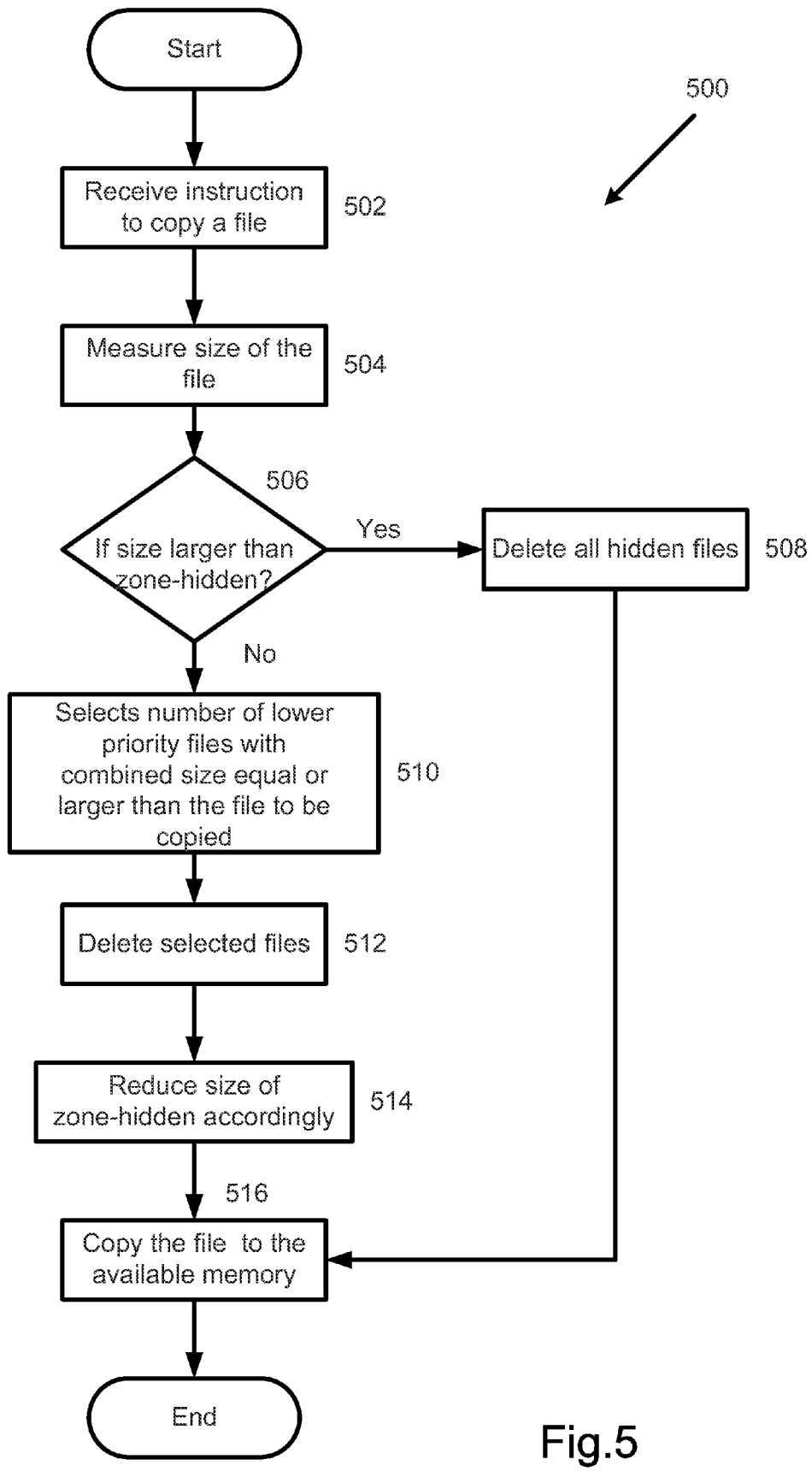
FIG. 5 is a flow diagram of depicting steps for copying a file into the storage system of a media player with the presence of the hidden files.

FIG. 5 is a flow diagram of depicting steps for copying a file into the storage system of a media player with the presence of the hidden files. The process 500 starts by a step 502 of receiving a user's instruction to copy a file from an external device to the media player. The external device includes a general purpose computing device such as a computer. The file can be a media asset that the user owns the right to use or a data file. The processor in the media player measures the size of the file (504). In a step 506, the size of the file is compared with the capacity of the zone-hidden. If the file size is larger than that of the zone-hidden, all hidden files are removed (508). Otherwise, a number of lower priority files in zone-hidden are selected, which are with a combined size equal or larger than the size of the file to be copied (510). All selected files are then deleted under the control of the processor in the media player (512). The zone-hidden capacity is then reduced accordingly (514). In a step 516, the file is copied into the storage system of the media player with a result that zone-hidden is eliminated or the size of it is reduced. It should be noted that the operation is transparent to the user, who does not feel any impact that the part of the storage system is used to store the hidden files pushed from an on-line merchandiser.

Figure 6:
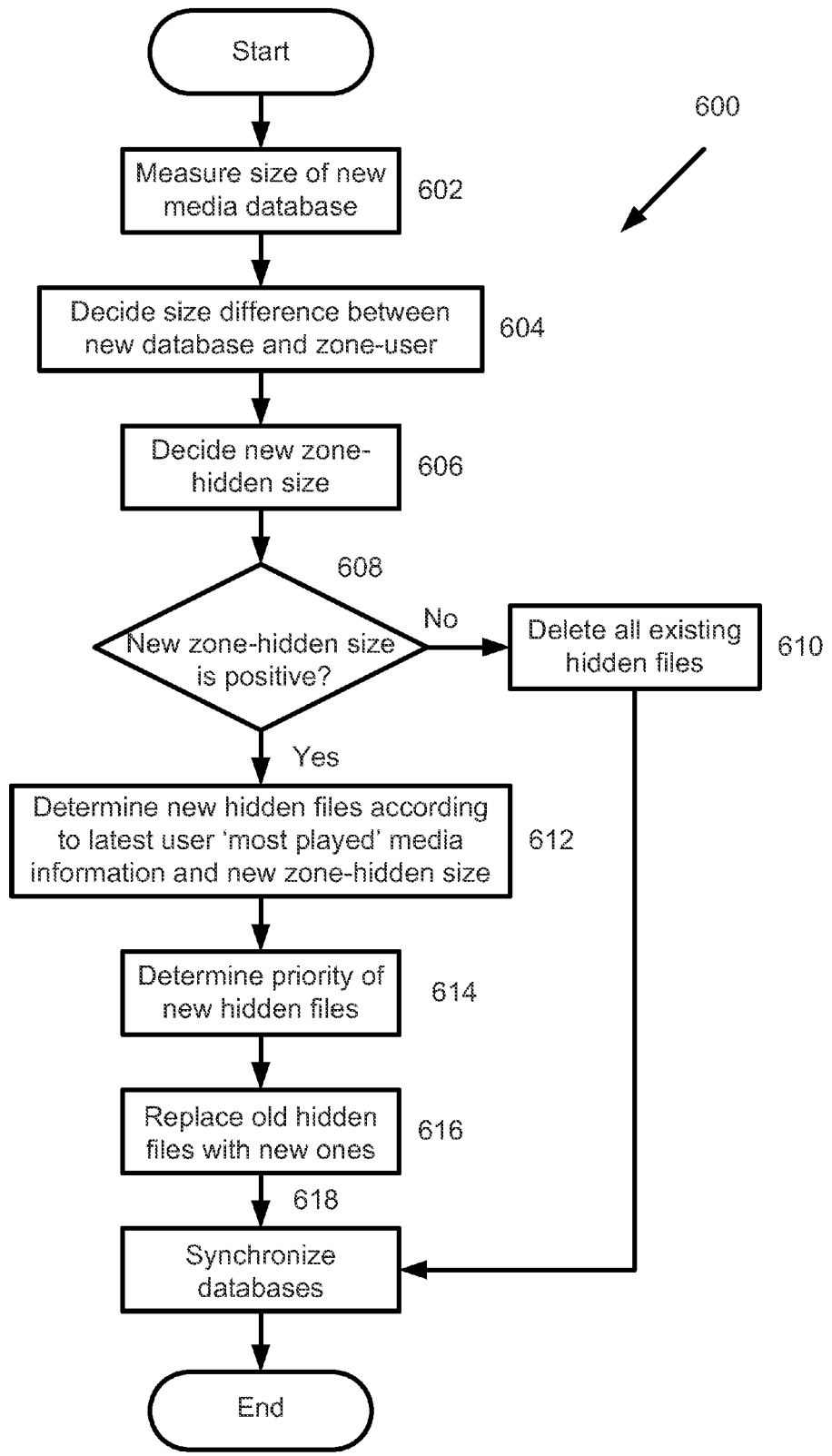
FIG. 6 is a flow diagram of depicting steps for synchronization of the media database of a media player with the one in a media server linked to an on-line merchandiser with an operation of pushing hidden media assets to available storage space in the media player.

FIG. 6 is a flow diagram of depicting steps for synchronization of the media database of a media player with the one in a media server. The media server is a general purpose computing device connected to the internet and an on-line merchandiser. The process 600 starts by a step 602 of measuring the size of the new media database in the media server. The size difference between the new and the existing database occupying zone-user in the media player is determined in a step 604. The updated zone-user capacity based upon the calculated difference can be decided. The zone-hidden capacity available for the media assets from the merchandiser can then be updated in the step 606. In a step 608, it is verified if zone-hidden capacity is available. In an extreme case, all media assets in the zone hidden are removed if the new media database is sufficiently large and the zone-hidden of the storage space needs to give all its capacity to the new media database in a step 610. If the zone-hidden has available storage space after taking into consideration of the new media database, a new list of media assets is determined by the on-line merchandiser based upon the user's media database. The new set of the media assets to be pushed to the user's media assets is then delivered via the media server by the use of the internet. In a more specific implementation, the list can be determined based upon a recorded history of the list of the "most played artists" as indicated by the step 612. In the step 614, the priority of each file is assigned accordingly. The existing hidden assets are replaced by new ones in the media player in a conventional way in a step 616. The last step 618 completes the synchronization of the media file database in the media player with the one in the media server. A synchronization process typically takes a significant amount of time. The process can be started as soon as the media player is hooked up with the media server.

Figure 7:
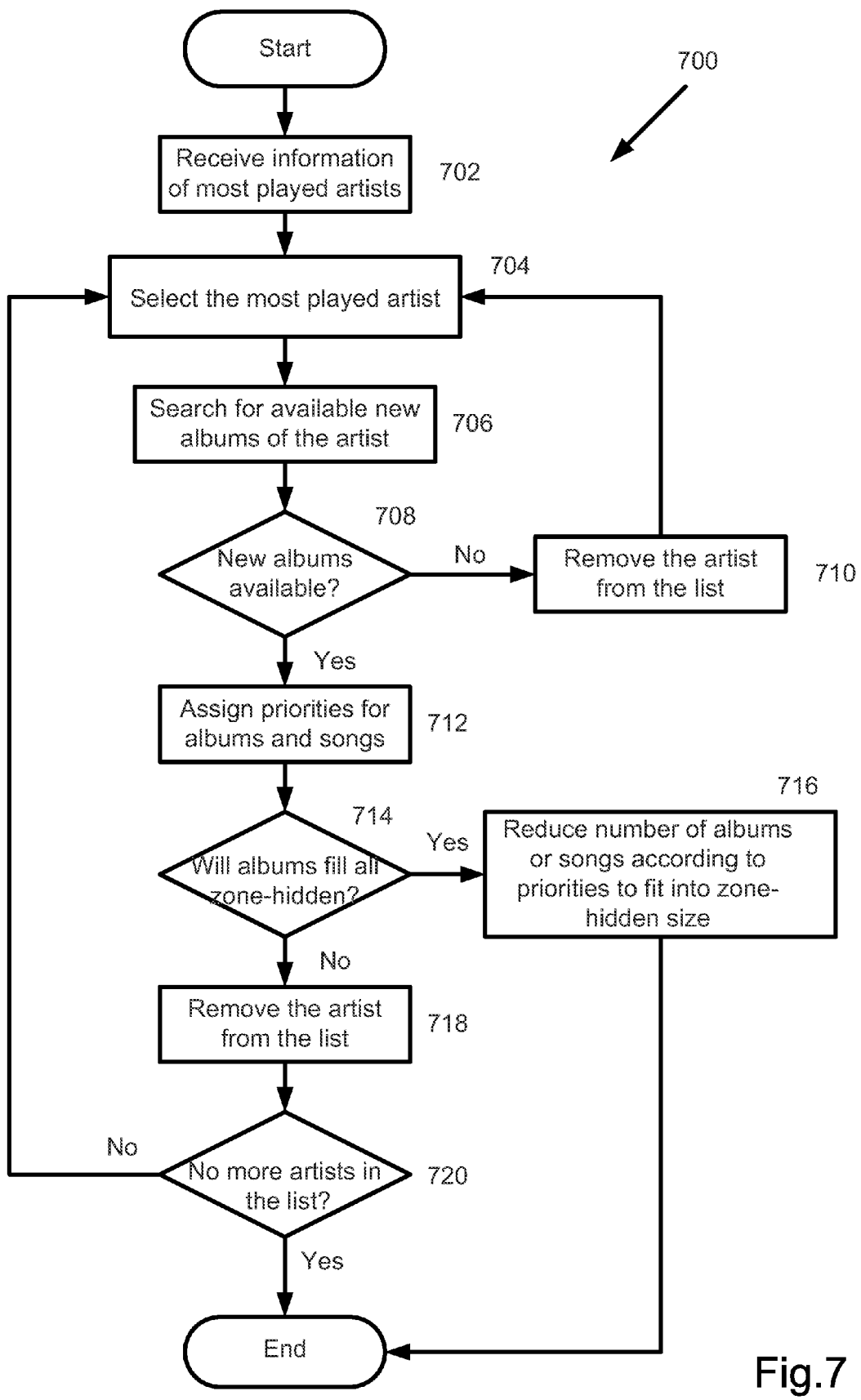
FIG. 7 is a flow diagram of depicting steps for selecting media assets to be pushed to a media player and for setting priorities for the files.

FIG. 7 is a flow diagram of depicting steps for selecting media assets to be pushed to a media player and for setting priorities for the files. The process 700 starts with receiving latest information by an on-line merchandiser about the "most played artists" from the media player hooked up with a server in a step 702. A user management program from the on-line merchandiser then selects the most played artist in a step 704 and searches for available albums that have not been included in user's media database in a step 706. If the additional albums are not available from the merchandiser's database (708), the artist name is removed from the list in a step 710 and the new most played artist is selected which is the next one in the list. Otherwise, the albums are selected and priorities are assigned to the songs in the albums in a step 712. The user management program then decides if the selected albums and songs will use up zone-hidden capacity of the media player (714). If the reviewing result is positive, the number of albums and songs are reduced according to priorities to fit the zone-hidden capacity (716). If the review result is negative, all the album and songs are kept in the list and the artist name is removed (718). The next most played artist is selected if there is any artist name is remained in the list and the process is repeated till either the zone-hidden capacity is used up or there are no more artists in the list. It should be noted that many variation could exist to select the media assets to be pushed to a user. For example, the list can be determined based upon the most recently played media assets. The assets can also be decided by selecting artists closely related to the artists in the most played artist list. Furthermore, the assets can be selected based on genre of the songs the user played. It can also be a strategy with a combination of all the above methods.

Figure 8:
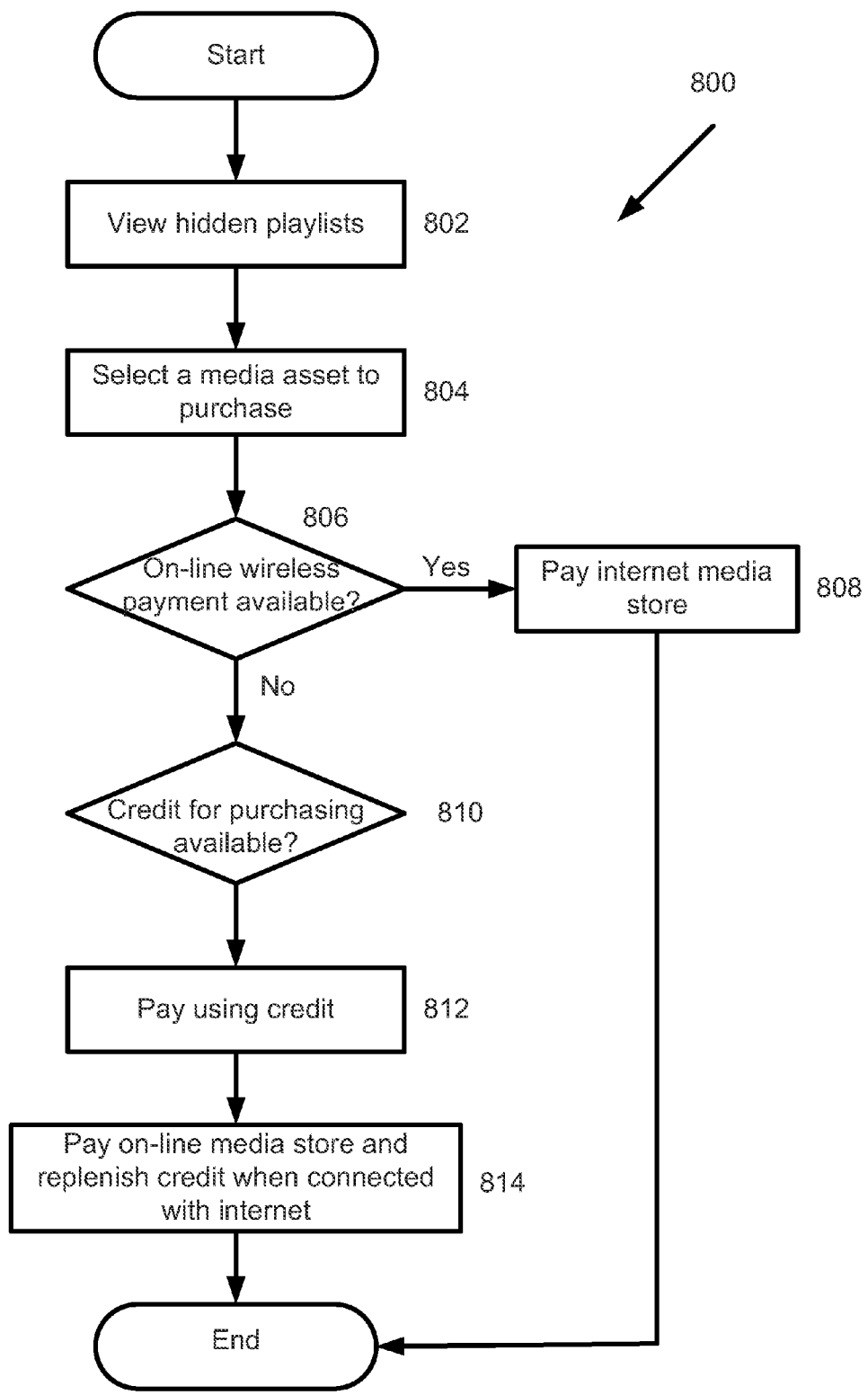
FIG. 8 is a flow diagram of depicting steps for a user to pay for a selected media asset.

FIG. 8 is a flow diagram of depicting steps for a user to pay for a selected media asset. The process 800 starts with a step 802 for a user viewing a playlist representing media assets pushed by an on-line merchandiser. As we described before, these assets are stored in a media player in a form of hidden assets which are only visible to the user with a series of persistent user actions to the input device. If an asset in such a category is selected by the user in a step 804 after the user's reviewing, he or she checks if the wireless on-line payment facilities are available in a step 806. If the response is positive, the user pays the media asset via wireless internet connection to the merchandiser in a step 808. Otherwise, the user checks if the credit is available for he or she to purchase the selected media item in a step 810. If the credit is available, in a step 812, the user consumes the credit and purchases the asset. The user can pay the on-line merchandiser next time when the media player is hooked up with the media server that is connected to the merchandiser in a step 814. After the payment, the credits can be replenished for the user. The on-line merchandiser may design various credit schemes for different users as known in the art.

The invention claimed is:

1. A hierarchical user interface of a media player for accessing media assets in a hierarchically ordered manner controlled by a processor of the media player, said interface comprising a data structure that classifies said media assets into two following groups:
   a. a first group of media assets that a user owns a right to consume, wherein said hierarchical user interface displays a first list of user selectable items on a first display screen after a plurality of user's input actions on a input device of the media player, wherein said items represent a subgroup of said first group of media assets, wherein said items are displayed in a sequentially ordered manner; and
   b. a second group of media assets that the user does not own a right to consume, wherein said hierarchical user interface displays a second list of user selectable items on a second display screen after a user's persist actuation of an input device in exceeding of a predetermined period of time while an optical mark controlled by an input device is being pointed to the last displayed item of said first list, wherein said second list of user selectable items represent a subgroup of said second group of media assets,
   wherein said interface further comprises a means of receiving the user's selection of one of said second list of displayed items through the input device and paying for owning the right to consume the selected media asset,
   wherein said interface further comprises a means of exiting the second display screen and returning to said first display screen after receiving a user's input action, and
   wherein actuation time is measured by the processor of the media player and said predetermined period of time is preset in between 1 to 10 seconds.

2. The hierarchical user interface as recited in claim 1, wherein said persistent user actuation of the input device further comprises:
   a. applying a force to a rotational user input device for a period of time in between 1 and 10 seconds;
   b. pressing an input button by the user for a period of time in between 1 and 10 seconds; and
   c. touching a touch sensitive screen or a touchpad for a period time in between 1 and 10 seconds.

3. The hierarchical user interface as recited in claim 2, wherein said persistent user actuation of the input device is accompanied by displaying a message on the display screen, wherein said message may include a form of a text, an image, a video and a multimedia, wherein said message further includes messages of price and payment methods.

4. The hierarchical user interface as recited in claim 2, wherein said persistent user actuation of the input device is accompanied by an audio signal or an audio message, wherein said signal or said message further includes messages of price and payment methods.

5. The hierarchical user interface as recited in claim 1, wherein said second group of media assets further include the media assets delivered to the media player by an on-line merchandiser.

6. The hierarchical user interface as recited in claim 1, wherein each of said media assets is associated with a media metadata, wherein said metadata further includes a format with a plurality of fields including ones for differentiating the assets that the user owns the right to consume from the ones that the user does not own the right to consume.

7. The hierarchical user interface recited in claim 6, wherein said format further includes a field indicating priority of the associated media asset, wherein media assets that the user owns the right to consume are ranked with a priority indicator "1" and media assets that the user does not own the right to consume are ranked with a priority indicator starting from "2" in a sequential manner.

8. The hierarchical user interface as recited in claim 7, wherein said priority represents the priority with regard to use storage space of the media player when the storage space is insufficient for storing said second group of media assets.

* * * * *